United States Patent

[11] 3,632,064

| [72] | Inventor | Claudio F. Oliver<br>1314 E. Sycamore Ave., Orange, Calif. 92666 |
|---|---|---|
| [21] | Appl. No. | 31,304 |
| [22] | Filed | Apr. 23, 1970 |
| [45] | Patented | Jan. 4, 1972 |

[54] MULTIPURPOSE AIRCRAFT
1 Claim, 10 Drawing Figs.

[52] U.S. Cl........................................... 244/13,
244/102 R, 244/118 P, 244/119, 244/123,
244/129 D, 244/129 S
[51] Int. Cl.............................................. B64c 1/10
[50] Field of Search........................................... 244/13,
118, 102, 119, 123, 129, 2, 125; 277/1; 339/116 C;
296/50

[56] References Cited
UNITED STATES PATENTS

| 1,291,686 | 1/1919 | Reiferscheid................ | 244/125 |
|---|---|---|---|
| 2,124,003 | 7/1938 | McDonnell, Jr. et al. .... | 244/118 |
| 2,183,676 | 12/1939 | Gwinn, Jr. .................. | 244/13 |
| 2,306,269 | 12/1942 | King............................ | 244/102 |
| 2,367,538 | 1/1945 | Sullivan....................... | 244/13 |
| 2,473,364 | 6/1949 | Dickinson et al............. | 244/118 P |
| 2,500,015 | 3/1950 | Tweney et al................ | 244/119 |
| 2,531,263 | 11/1950 | Fink et al..................... | 244/129 D |
| 2,562,490 | 7/1951 | Hall.............................. | 244/2 |
| 2,766,157 | 10/1956 | Peterson....................... | 339/116 C |
| 3,116,198 | 12/1963 | Grawey et al................ | 277/1 |
| 3,381,921 | 5/1968 | McDonough et al. ........ | 244/118 |
| 3,387,406 | 6/1968 | Coker et al................... | 296/50 |
| 3,473,761 | 10/1969 | Chutter........................ | 244/119 |

*Primary Examiner*—Milton Buchler
*Assistant Examiner*—Steven W. Weinrieb
*Attorney*—Fowler, Knobbe & Martens

ABSTRACT: A lightweight plastic aircraft for use in carrying cargo or passengers for relatively short distances. The plane includes an upper wing and a lower wing both directly attached to and extending across the fuselage. A pair of longerons are attached at their forward ends to the main spar of the upper wing and extend rearwardly along the upper corners of the fuselage and further beyond the fuselage to support a tail section. The rear of the fuselage opens to permit installation and removal of modules for carrying cargo or passengers. In addition to retractable wheeled landing gear attached to the lower wing and the forward part of the fuselage, the plane is provided with retractable collapsible pontoons which permit landing on water. A sealant spray system is included to mend leaks in the pontoons. Also, the fuselage door can be sealed so that the fuselage becomes a buoyant float in the event of emergency water landing.

PATENTED JAN 4 1972

INVENTOR.
CLAUDIO F. OLIVER

BY FOWLER, KNOBBE
& MARTENS
ATTORNEYS.

INVENTOR.
CLAUDIO F. OLIVER

BY
FOWLER, KNOBBE
& MARTENS
ATTORNEYS.

INVENTOR.
CLAUDIO F. OLIVER

BY FOWLER, KNOBBE & MARTENS
ATTORNEYS.

MULTIPURPOSE AIRCRAFT

This invention relates to a low-cost plastic structured aircraft capable of short takeoff and landing and designed to perform a variety of functions.

As the aircraft industry has developed, the major emphasis appears to have been on speed and increased range and also on specialization of tasks for a particular aircraft. An area which appears to have been somewhat overlooked in this development is the need for a truly versatile short range and short takeoff and landing aircraft capable of landing on land, water or snow and capable of being quickly adapted to carry cargo, passengers, or to serve as an ambulance craft. In order to be practical and versatile, it is necessary that the craft provide the capability for multienvironment landing and takeoff at the discretion of the pilot without specialized and time consuming conversions. Also, from an economical standpoint, it is important that the craft be simply constructed to provide the capability for carrying a high payload per dollar in comparison with existing craft. For the short haul, aircraft speed is of very secondary importance compared to the landing and takeoff requirements and the payload capability.

Briefly stated, the multipurpose airplane of the invention includes a fuselage having a main boxlike portion for carrying cargo or personnel with an upper wing located at the upper forward end of the fuselage portion and extending completely across the fuselage. A lower wing is positioned adjacent the lower end of the boxlike fuselage portion and extends across the fuselage. A pair of spaced longerons extend along the upper outer edges of the fuselage and rearwardly from the fuselage with the forward ends of the longerons being directly attached to the upper wing, and the rear ends of the longerons support a tail assembly. Preferably, all of the structural components of the airplane are made of lightweight plastic which has the advantage of being conveniently molded and bonded to other plastic components.

To provide the takeoff and landing capability in different environments, retractable wheels and inflatable pontoons are located in the lower wing, the pontoons, when not inflated, being retractable into a canister which is pivotally mounted on the wing spars to be swung into the wing. As a safety feature, the pontoons are provided with automatically releasable means for spraying a sealant into the interior of the pontoon in the event of leakage.

The rear of the boxlike fuselage is provided with a door which can be completely swung open to permit full access to the interior. If the craft is to be used for carrying passengers, an entire passenger module may be rolled into or out of the fuselage by way of the large rear door. Seating and luggage racks within the passenger module can be easily converted into cots to permit the aircraft to be used for carrying bed ridden passengers, such as in emergency ambulance service. If the craft is to be used for carrying cargo, the entire passenger module can be replaced by a cargo carrying module through the rear door.

As a further feature of the aircraft, its upper surface above the fuselage and the longerons is made relatively flat and the rear door is provided with a ladder to permit access to the top of the aircraft so that it may be used as an observation deck or fishing deck.

For a further understanding of this unique aircraft, reference may be had to the following detailed description and drawings in which.

Figure 1:
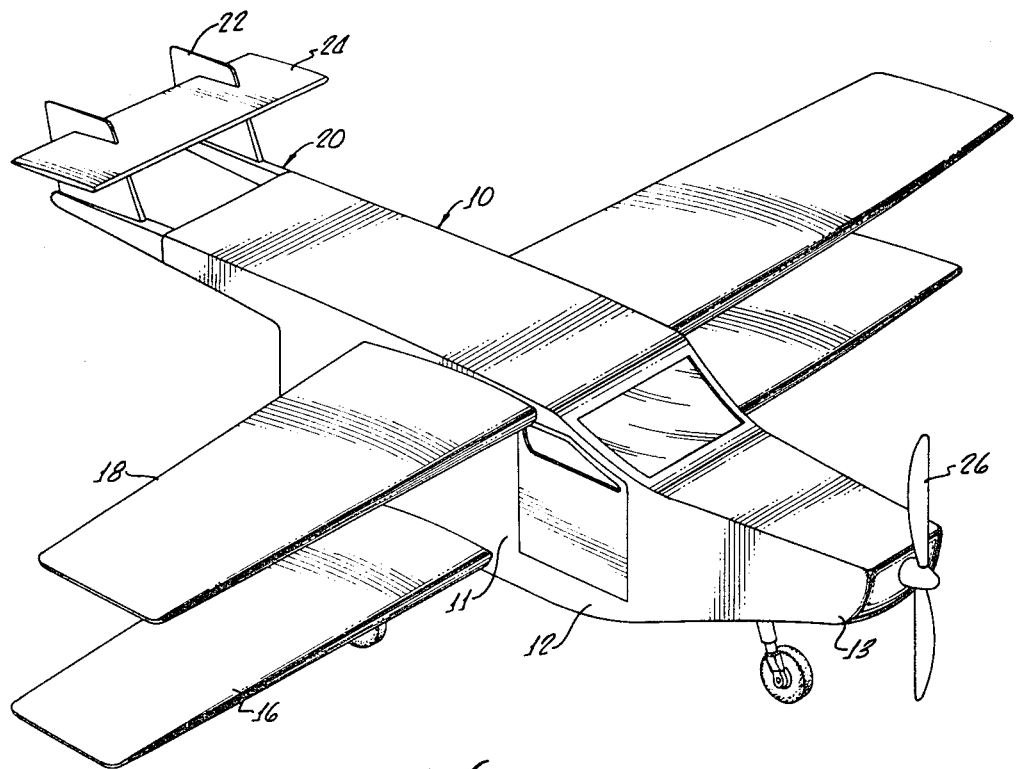
FIG. 1 is a front perspective view of the multipurpose aircraft of the invention.
Figure 2:
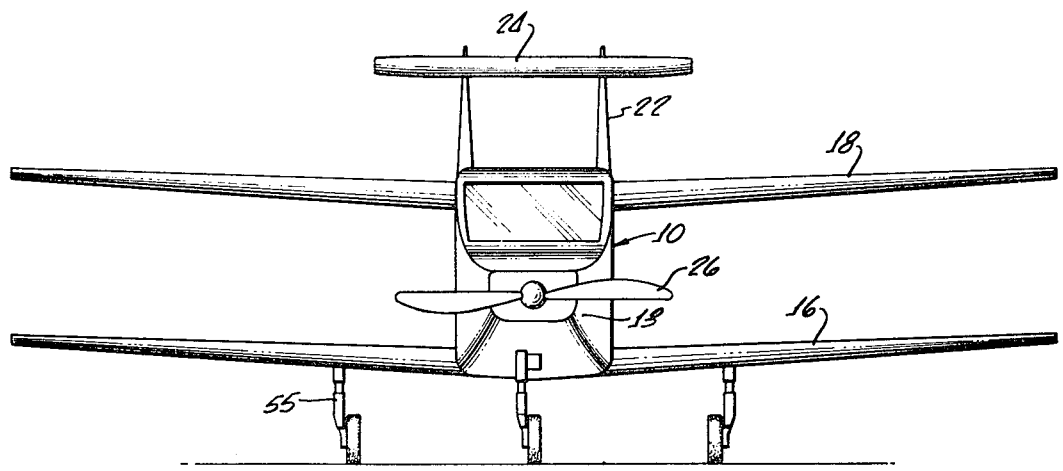
FIG. 2 is a front elongated view of the craft.
Figure 3:
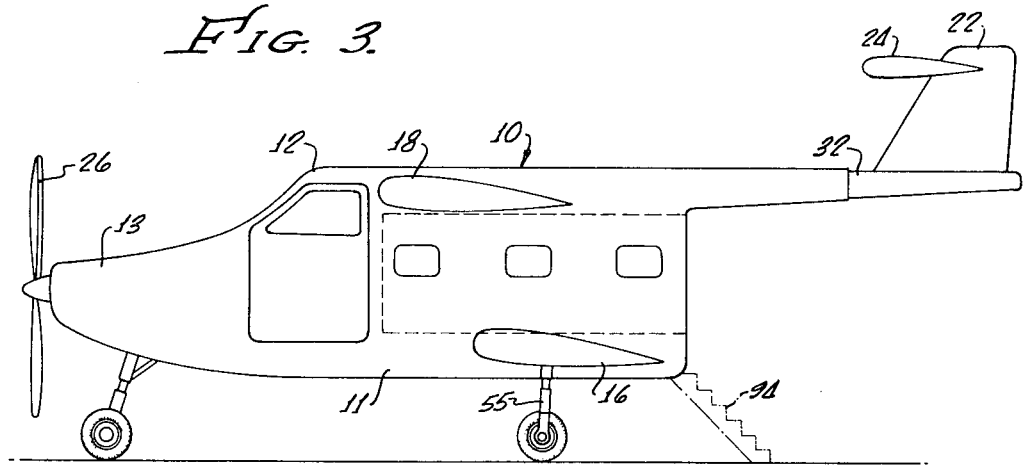
FIG. 3 is a side elevational view of the craft showing the rear door lowered to serve as steps into the fuselage.

Referring to FIGS. 1–3, the aircraft of the invention may be seen as having a fuselage 10 with a main boxlike portion 11 for carrying cargo or personnel, a pilot's compartment 12 forward of the main portion, and a nose engine compartment 13, a lower wing 16 parallel to an upper wing 18; and a tail section 20 including a pair of vertical tail members 22 supporting a horizontal tail control surface 24.

The aircraft is propelled by a single engine driving a propeller 26. If more power is desired, a twin engine version may be provided by mounting one engine on each side of the upper wing of the biplane. If a triengine version is desired, an engine in the nose compartment may be added to the twin engine version. Additionally a pusher engine may be mounted in the tail section between the vertical tail surfaces 22 and below the horizontal surface 24.

The upper wing 18 is located adjacent the lower rear end of the main fuselage portion. Thus the wings are staggered from front to rear with the main fuselage portion being directly connected to both wings. The wings are identical in overall size and shape, thus minimizing manufacturing costs.

Figure 5:
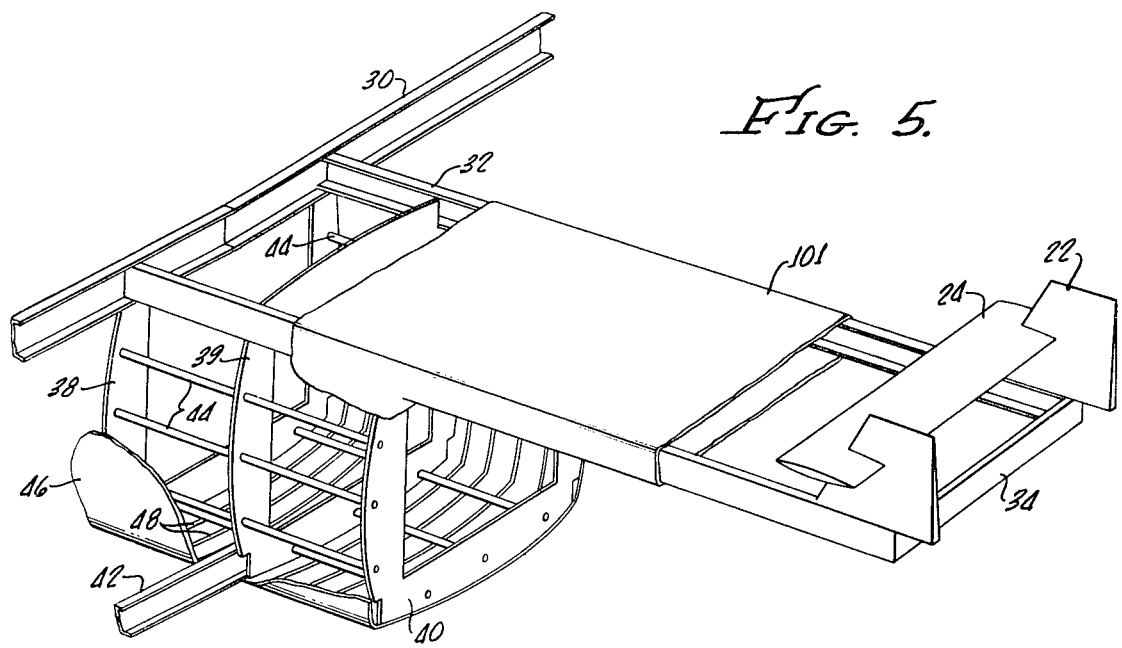
FIG. 5 is a perspective cutaway view of the fuselage construction including the connection of the main wing spars to the longerons of the fuselage and including the tail assembly.

Wherever possible, all of the structural components of the aircraft are made of lightweight plastic and bonded together as opposed to using conventional structural metals and their accompanying rivets, bolts, etc. As an important part of obtaining the necessary strength of the aircraft, it is desirable that the main structural components be directly connected together whenever possible. Referring to FIG. 5, the main horizontal spar 30 of each of the upper wings is shown as extending completely across the top of the fuselage boxlike portion 11 where they are joined together by bonding or other suitable means to provide an integral structural member from wing tip to wing tip. These spars are directly connected to a pair of longitudinally extending spaced longerons 32 which extend rearwardly from upper wing spars 30 along the outer upper edges of the main fuselage portion 11, and with the longerons extending beyond the fuselage to support the tail section 20. The ends of the longerons 32 are joined by a crossbeam 34 to form a boxlike frame with the longerons and the upper wing spars to enhance the strength of the aircraft.

The fuselage construction additionally includes a plurality of spaced, generally rectangular, framelike bulk heads 38, 39 and 40 extending transversely with respect to the main longerons 32. The main longerons 32 are bonded directly to the upper corners of the bulk heads. While only three bulkheads are illustrated, it should be understood that additional bulk heads may be provided as needed and determined by the length of the plane.

The flat forward surface of the upper wing spar 30 is bonded to the bulkhead 38 to provide an integral structure. Like the upper wing, the lower wing 16 is also provided with a main spar 42 which extends completely across the lower portions of the fuselage. As seen in FIG. 5, the lower wing spar is connected to the flat forward lower portion of the bulkhead 39. The wing spars 30 and 42 are the same cross section and length as the main longerons 32, thus simplifying manufacturing operations.

Each of the bulk heads is provided with a plurality of axially extending holes along its outer periphery. Longitudinally extending fuselage longerons 44 extend through the holes in the bulkheads and are bonded to the bulkheads. If desired, the longerson 44 may be formed in sections and spliced at the bulk heads by suitable tubular plastic nipples (not shown). Also, diagonal fuselage longerons may be utilized to add further strength.

The exterior of the fuselage is enclosed by molded contoured skin sections 46, which are stiffened with ribs 48. The skin sections 46 are adhesively bonded to the fuselage bulkheads and are additionally bonded to each other at their outer edges.

Figure 4:
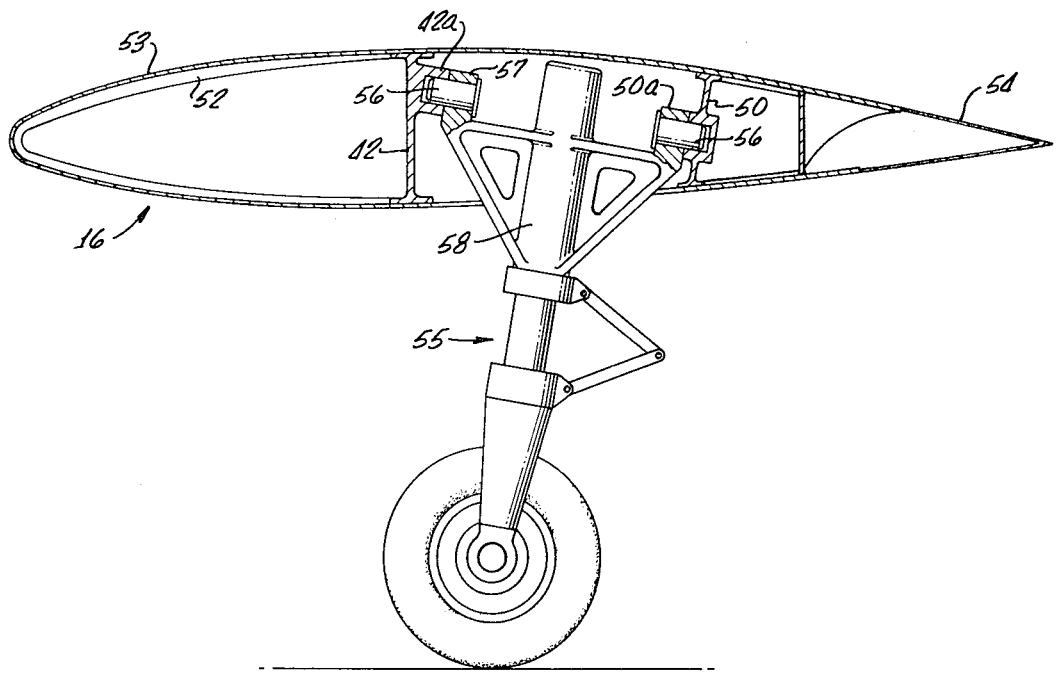
FIG. 4 is a cross-sectional view of the lower wing illustrating one unit of the wheel landing gear in elevation.

Referring to FIG. 4, the cross section of the lower wing 16, which is like that of the upper wing 18, includes in addition to the main spar 42 an auxiliary spar 50 extending parallel to the main spar. The wings are further formed with a plurality of structural supports 52 attached to the spars 42 and 50 at spaced intervals along the spars. Each of these wing supports has an exterior shape which together give the wing its desired configuration. These support members may be separately formed and then bonded to the spar or they may integrally be formed with the spar. The first support on the fuselage end of the wing is bonded to the adjacent fuselage bulkheads. Plastic skin sections 53 similar to the sections 46, extend over these supports and are bonded thereto to form the exterior surface of the wing. The wings are also provided with suitable flaps 54 and ailerons (not shown).

One of the versatile features of the aircraft of the invention is that it can be used for takeoff and landing on land, water or snow. Referring to FIG. 4, wheeled landing gear 55 is shown supported by the lower wing. More specifically the main spar 42 is formed with a bearing socket 42a and the auxiliary spar 50 parallel to the main spar is formed with a similar bearing socket 50a. Within these sockets are positioned pivot pins 56 of a bracket 57 attached to a landing struts 58. This mounting enables the wheeled struts to be retracted into the wing through a cavity in its lower surface about the axis of the pivot pins. As can be seen from FIGS. 2 and 3, a wheeled landing strut 55 is provided on each side of the craft attached to the lower wing and a third strut is supported in suitable fashion to be retracted into the nose compartment.

Figure 6:
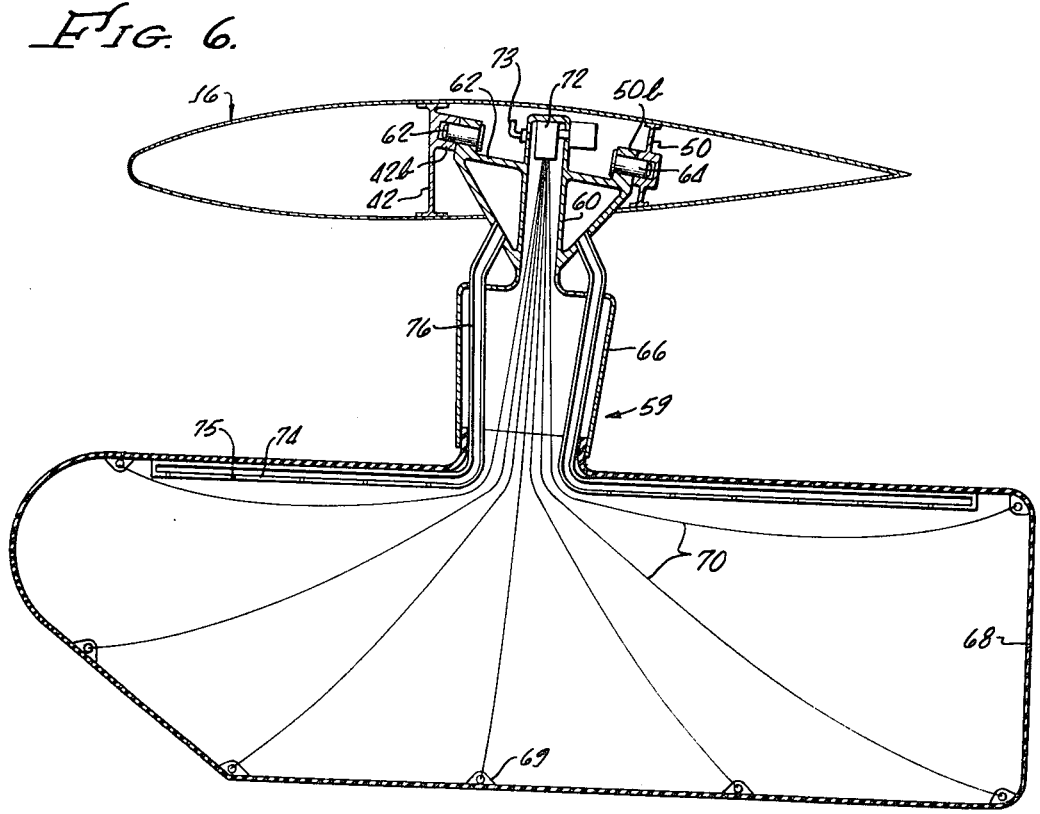
FIG. 6 is a cross-sectional view of the lower wing and one of the pontoons shown in inflated condition.
Figure 7:
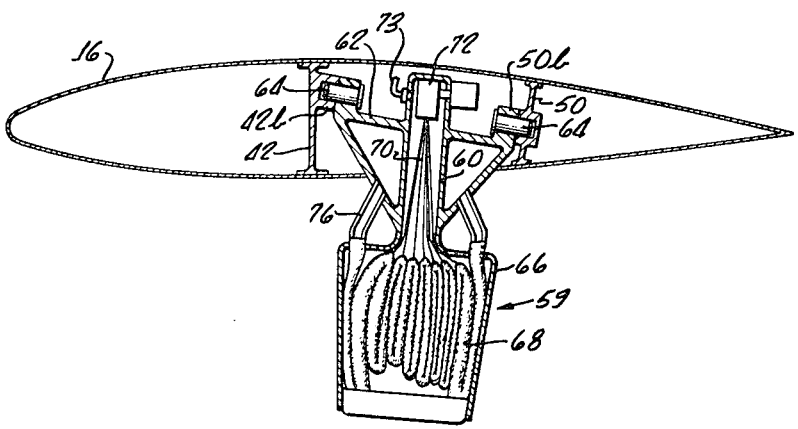
FIG. 7 is a view similar to FIG. 6 with the pontoon deflated and retracted into its canister.

In addition to the wheeled landing gear, there are provided three water float landing gear assemblies 59 supported by the lower wing 16 and the nose compartment 13 adjacent the wheeled landing gear 55. Referring to FIGS. 6 and 7, a float landing gear assembly 59 is shown in cross section attached to the lower wing. More specifically, this assembly comprises a tubular strut 60 attached to a bracket 62 carrying aligned pivot pins 64 which are supported in sockets 42b and 50b formed in the main spar 42 and the auxiliary spar 50 of the lower wing. Thus, in a manner similar to the wheel landing gear, the float landing gear can be rotated 90° about the axis of the pins 64 into the lower wing when not in use so that a smooth aerodynamic surface is provided on the under portion of the wing.

Formed on the lower portion of the strut is a hollow canister 66 which opens at its upper end into the strut 60 and which is opened at its lower end. Within the canister there is provided an inflatable float or pontoon 68 made of heavy rubber or plasticlike material. In FIG. 6 the pontoon is shown in inflated form in FIG. 7 it is shown entirely retracted into the canister 66. As can be seen, a plurality of retracting lines 70 are attached to suitable tabs 69 formed integral with the interior of the inflatable pontoon 68 and extending upwardly through the hollow canister and the hollow strut where they are connected to suitable motorized means 72 for withdrawing the lines 70 into the strut 60. As seen from FIG. 6, the pontoon has an open mouth on its upper end which is bonded to the lower end of the canister. For inflating and deflating the pontoon, there is provided a conduit 73 leading to a suitable controlled source of compressed air. Both the inflating means and the retracting means can be activated from the pilot's compartment.

Because of the possibilities of leaks developing in the pontoon and the difficulty of locating the leaks, not to mention the problem of repairing a leak while the pontoon is in operation, there is provided a safety repair system. More specifically, there is provided a flat annular manifold 74 attached to the upper wall of the pontoon as seen in FIG. 6 with the manifold having a plurality of openings 75 defining spray nozzles formed in its lower wall. The manifold is further connected by means of a pair of conduits 76 extending upwardly through the canister 66 and attached to the bracket 62 supporting the strut 60 for connection to a supply (not shown) of sealant material carried in the wing. Thus, if a leak should develop, the supply of sealant may be remotely activated causing the sealant to be ducted downwardly through the conduit 76 into the manifold 74 and sprayed through the nozzles onto the entire interior surface of the pontoon. The sealant is of a type which will quickly set so as to seal the puncture. An appropriate pneumatic leak detection mechanism (not shown) for the pontoon 68 may be provided in cooperation with the means for inflating the pontoon.

Figure 8:
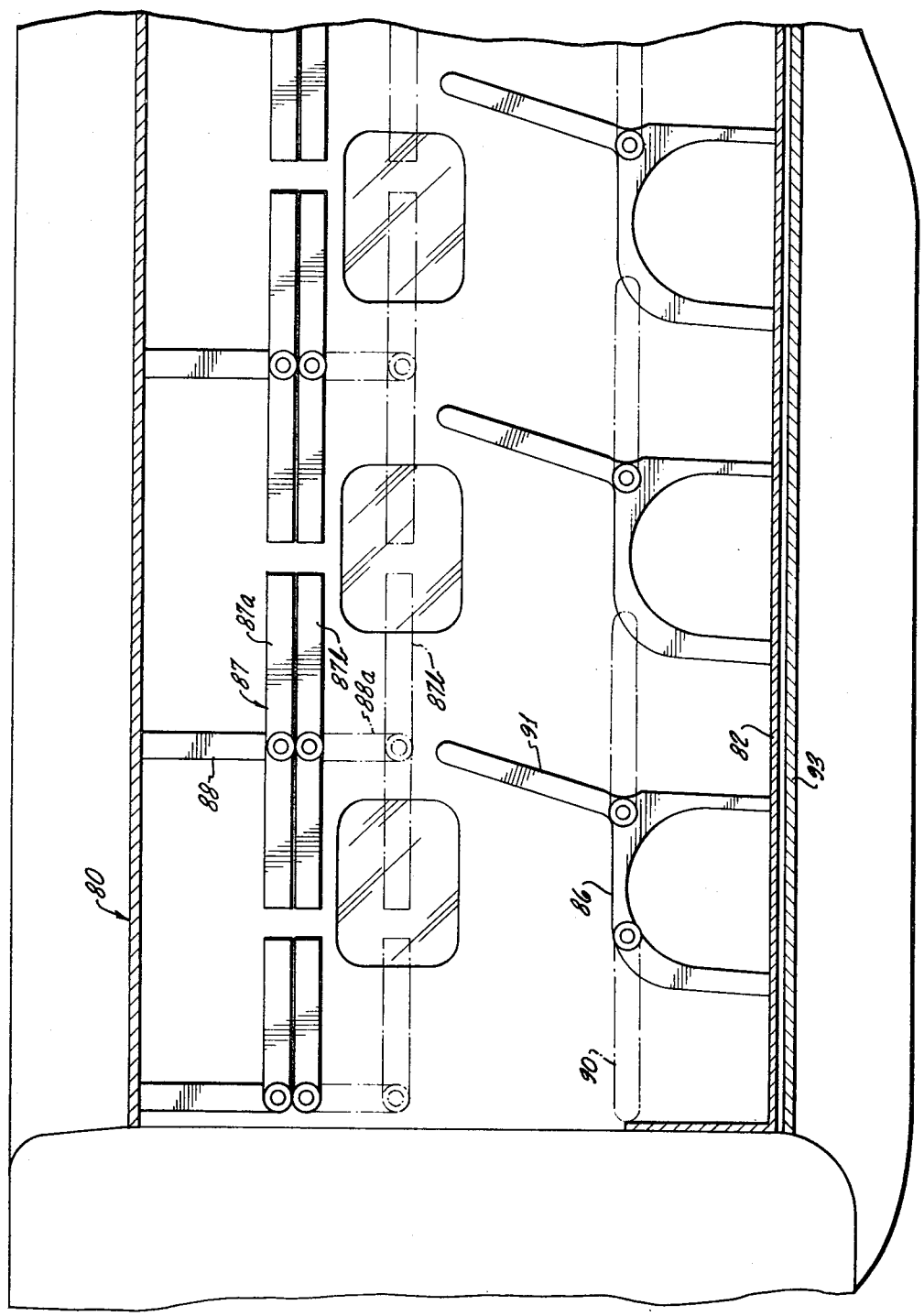
FIG. 8 is a side cross-sectional view of the fuselage with a passenger module shown therein.
Figure 9:
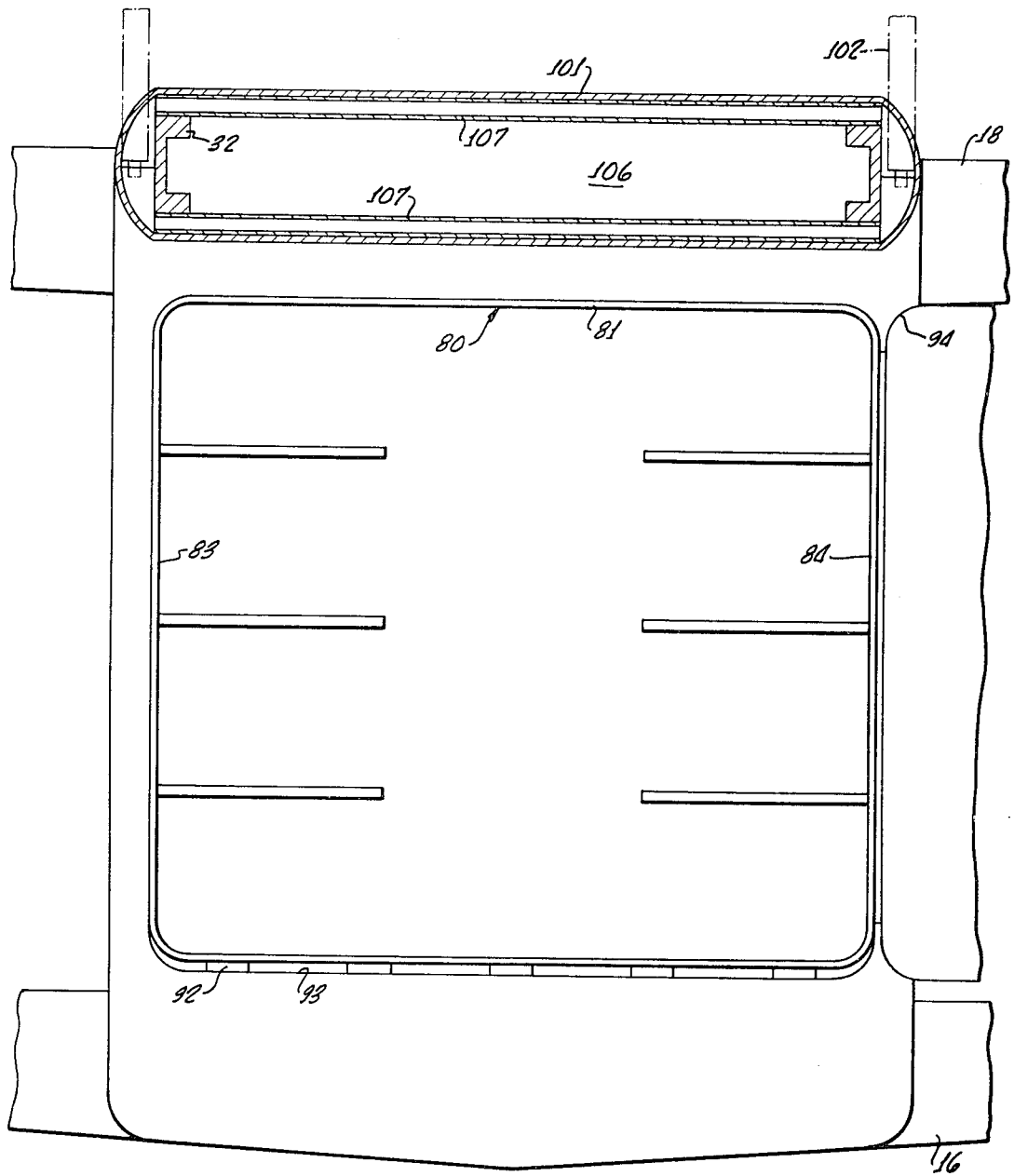
FIG. 9 is an end elevational view showing the fuselage with the rear doors open and showing the rear storage compartment, and showing in dotted lines guide rails for the sun deck.

One of the features of this invention adding to the versatility of the airplane is that the craft may be used to perform various functions, such as carrying regular passengers, serving as an ambulance, or carrying cargo. In general this is accomplished by providing modules which may be inserted and withdrawn from the fuselage by having the entire rear end of the fuselage accessible by a door. Referring to FIGS. 8 and 9, there is shown a passenger module 80 having a rectangular cross section defined by a top wall 81, a floor 82 and sidewalls 83 and 84. As shown in FIG. 8, there is a plurality of chairs 85 mounted on the floor 82 of the module. Positioned above the chairs 86 are horizontal luggage racks 87 suspended from the module top wall 81 by vertical supports 88.

This same module 80 is convertible into an ambulance module to accommodate a group of bed ridden passengers. For this purpose, a front portion 90 of the front chair flips upwardly into the horizontal dotted line position illustrated in FIG. 8. The back 91 of the front chair flips rearwardly to a horizontal position where it abuts the seat behind it. Similarly, the backs of the remaining chairs flip rearwardly into a horizontal position illustrated in dotted lines to form a lower level of beds. The luggage racks 87 form an upper level of beds. If a third level is desired, the luggage racks are designed such that the vertical supports 88 are telescopic and the horizontal racks 87 are formed in upper and lower segments 87a and 87b. Thus, the lower segments 87b of the horizontal racks 87 may be lowered on the telescoping vertical supports 88a to the position illustrated in dotted lines in FIG. 8 to form a middle level of beds.

Referring to FIG. 9, the passenger module 80, which is shown schematically converted to the ambulance version, is mounted on a roller means 92 on the floor 93 of the fuselage. The details of this arrangement are not described in that various approaches can be employed. Also, suitable means (not shown) are provided to maintain the module 80 stationary in the fuselage.

Figure 10:
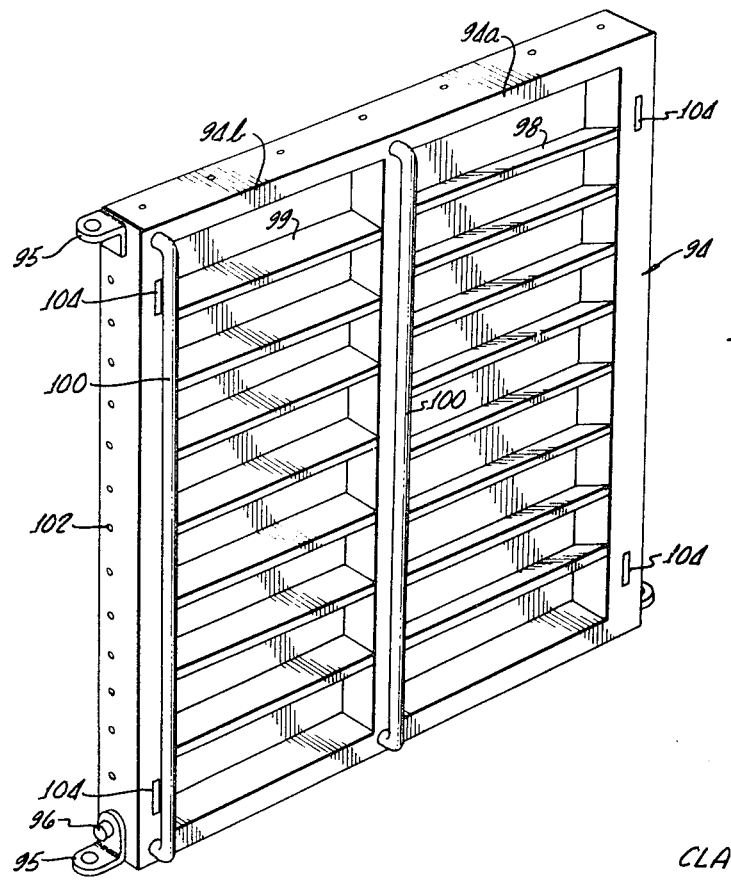
FIG. 10 is a perspective view of the rear doors showing the ladders formed on the doors.

A door 94 for closing the rear end of the fuselage is shown in open position in FIG. 9. The door is shown in FIG. 10 as a single member which extends across the entire end of the fuselage. The door is provided on one side with a pair of brackets 95 having holes therein which are mounted on suitable supports attached to the fuselage to enable the door to pivot around a vertical axis. The door 94 is also provided with a pair of horizontal pins 96 which enable it to pivot around a horizontal axis. Suitable latching means for opening and closing the door in its two different modes are needed, although they are not shown in the drawing in that various known arrangements can be employed.

The right side 94a of the door, as viewed in FIG. 10, is formed with steps 98 oriented at an angle such that when the door is pivoted around its horizontal pins 96 into its fully open position as is shown in FIG. 3, the steps 98 serve as steps for leaving and entering the plane.

The other side 94b of the door includes steps 99 at an opposite angle to enable the door to serve as a ladder for climbing upwardly. A pair of hand rails 100 on opposite sides of these steps facilitate climbing. With the door pivoted open around its vertical axis by means of the brackets 95, the steps 99 may be used as a ladder for climbing onto the top surface 101 of the plane which as can be seen from FIGS. 5 and 9, is relatively flat. Thus, when the plane is at rest on the ground or on water, the relatively flat upper surface 99 of the plane may be used as an observation deck or a fishing platform. A pair of removable railings 102 are illustrated in dashed lines in FIG. 9 to serve as a protective feature when the observation deck is being used. A suitable arrangement (not shown) is provided to position the door when the ladder is being used in connection with the observation deck 101.

As an additional safety feature for the aircraft, the door 94 is provided with a plurality of spray nozzles 102 indicated schematically in FIG. 10. These nozzles are connected to a source of fluid sealant release mechanisms 104 which can be actuated remotely from the pilot's compartment. Hence, if the plane should have an emergency landing on water, the pilot can actuate the sealant release mechanisms 104 causing the sealant to be dispensed around the periphery of the door to bond the door to the surrounding frame in the fuselage, making the fuselage an airtight buoyant compartment. A similar sealant release arrangement (not shown) can be provided for the door to the pilot's compartment shown in FIG. 1.

Referring to FIG. 9, an additional feature of the aircraft is that the space 106 extending from the rear of the fuselage to the tail section between the main longerons 32 is enclosed by suitable skin sections 107 to define a luggage compartment for lightweight bulky items. Access to the compartment is provided by a suitable door (not shown) in the bottom wall of the compartment adjacent the main door in the fuselage.

One of the advantages of the multipurpose aircraft described in the foregoing paragraphs which should be appreciated is that utilizing the personnel module provides a measure of noise abatement which is not obtained from conventional aircraft. The fuselage skin and the personnel module skin together with the air space between the fuselage and the module provide noise insulation characteristics which reduce the noise level within the personnel module by a considerable degree.

Another aspect of noise suppression which affects both passenger comfort as well as external noise concerns the wing loading and the engines provided. One of the main contributors of aircraft noise is the high-spped propeller rotations required by most prop planes at takeoff. The double winged structure described provides a very large wing surface area with respect to the load carried by the aircraft. By using the multiengine approach, as described above, the plane is capable of taking off with relatively low engine and propeller speeds which reduces the noise output. Also, this permits takeoff and landing on a relatively short runway.

I claim:
1. A multipurpose, short takeoff and landing airplane having its structural components made substantially of plastic comprising:
   a fuselage having a main boxlike portion for carrying cargo or personnel and including a plurality of longitudinally spaced framelike bulkheads having generally rectangular configuration for supporting partitions in the fuselage wall;
   an upper wing located at the upper forward end of said fuselage portion and including an upper wing spar extending across the fuselage and the upper wing;
   a lower wing positioned adjacent the lower rear end of said fuselage portion including a lower wing spar extending across the fuselage and the lower wing;
   a pair of spaced longerons extending along the upper edges of the fuselage and rearwardly from the fuselage attached to said bulkheads, the forward ends of the longerons being directly attached to the upper wing spar;
   a tail assembly attached to the rear ends of the longerons and extending upwardly above the level of the fuselage;
   said wing spars being made in two equal sections joined at the center of the wings and said upper and lower wing spar sections being identical in length and cross section to each other and to said longerons;
   means enclosing the portions of the longerons extending between the fuselage and tail assembly to define an elongated storage compartment;
   door means extending substantially across the entire rear wall of the fuselage below said longerons;
   personnel or cargo carrying means formed as a separate module adapted to be rolled into and out of the fuselage by way of said door means, said personnel carrying module including seating means and storage racks which are convertible into an upper and a lower level of beds such that the module may be used for sleeping accommodations or may be used for transporting sick or injured personnel;
   an engine and pilot compartment formed in the front end of the fuselage forward of the upper wing;
   collapsible, retractable pontoon landing gear on each side of the fuselage supported by said lower wing spars;
   a collapsible, retractable pontoon supported by the fuselage beneath said engine and pilot compartment, and
   retractable wheeled landing gear mounted on the lower wing.

\* \* \* \* \*